(12) United States Patent
Govindarajan et al.

(10) Patent No.: US 7,269,850 B2
(45) Date of Patent: Sep. 11, 2007

(54) SYSTEMS AND METHODS FOR DETECTING AND TRACING DENIAL OF SERVICE ATTACKS

(75) Inventors: Priya Govindarajan, Hillsboro, OR (US); Chun-Yang Chiu, Daly City, CA (US)

(73) Assignee: Intel Corporation, Santa Clara, CA (US)

( * ) Notice: Subject to any disclaimer, the term of this patent is extended or adjusted under 35 U.S.C. 154(b) by 424 days.

(21) Appl. No.: 10/335,197

(22) Filed: Dec. 31, 2002

(65) Prior Publication Data

US 2004/0128550 A1    Jul. 1, 2004

(51) Int. Cl.
*H04L 29/06*    (2006.01)
(52) U.S. Cl. .......................................... 726/22
(58) Field of Classification Search ............. 726/22–25
See application file for complete search history.

(56) References Cited

U.S. PATENT DOCUMENTS

| | | | |
|---|---|---|---|
| 6,487,666 B1 * | 11/2002 | Shanklin et al. ............... | 726/23 |
| 6,944,673 B2 * | 9/2005 | Malan et al. ................ | 709/237 |
| 2002/0032871 A1 * | 3/2002 | Malan et al. ................ | 713/201 |

FOREIGN PATENT DOCUMENTS

| | | | |
|---|---|---|---|
| WO | WO-0104733 A1 | 1/2001 | |
| WO | WO-0146807 A1 | 6/2001 | |
| WO | WO-0219661 A2 | 3/2002 | |

OTHER PUBLICATIONS

"Mandrake Linux 9.0 Quick-Configuration Server Guide, Chapter 10, Network Security", Sep. 2002, pp. 1-9, obtained from http://www.ip97.com/mandrake/network-security.html.*

"Monitor and inspect network activities for unexpected behavior", Oct. 2000, pp. 1-7, obtained from http://www.cert.org/security-improvement/practices/p094.html.*

CERT, "Denial of Service Attacks", Jun. 4, 2001, pp. 1-7, obtained from http://www.cert.org/tech_tips/denial_of_service.html.*

Reactive Network Solutions, "Reactive Network Solutions' FloodGuard System Blocks Devastating Denial-of-Service Attacks", Feb. 19, 2002, pp. 1-3, obtained from http://www.prnewswire.com/cgi-bin/stories.pl?ACCT=104&STORY=/www/story/02-19-2002/0001671435&EDATE=.*

Durham, D. , et al., "Elimination of Distributed Denial of Service Attacks using Programmable Network Processors", *Intel Research and Development*, Version 1.0, obtained from <URL:download.intel.com>, (Jun. 2002), 4 p.

* cited by examiner

*Primary Examiner*—Emmanuel L. Moise
*Assistant Examiner*—Jeffrey Popham
(74) *Attorney, Agent, or Firm*—Schwegman, Lundberg, Woessner & Kluth, P.A.

(57) ABSTRACT

Systems and methods for detecting and tracing a denial-of-service attack are disclosed. One aspect of the systems and methods includes providing a plurality of attack detection modules and a plurality of broker modules operable to communicably couple to a network. The attack detection modules operate to detect a potential denial-of-service attack on network segment. An attack signature for the potential denial of service attack may be forwarded to one or more broker modules on the network segment. The broker modules collectively analyze the data in order to determine a source or sources for the attack.

6 Claims, 5 Drawing Sheets

SYSTEMS AND METHODS FOR DETECTING AND TRACING DENIAL OF SERVICE ATTACKS

FIELD

The present invention relates generally to computerized systems and methods for handling denial of service attacks, and more particularly to detecting an attack and tracing an attack back to a source.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Intel Corporation. All Rights Reserved.

BACKGROUND

The use of computer networks and in particular the Internet for both business and personal reasons continues to grow at a rapid pace. For example, users increasingly rely on the Internet for business and personal communications, commercial transactions, and for distributing and gathering information of all kinds. However, with this increased reliance there is also increased vulnerability to harm caused by network outages.

One way that malicious users attempt to exploit this vulnerability is through a denial-of-service (DoS) attack. Denial-of-service attacks are attempts to overload or crash systems connected to a network such as the Internet by repeatedly targeting the system with so much data that it can no longer process legitimate requests in a timely manner. In fact, a DoS attack can overwhelm a system to the point that it crashes. Such attacks cause economic harm because the victim of the attack must spend time attempting to determine the source of the attack, and may also cause the victim to lose sales that would have otherwise occurred but for the attack.

Over time, DoS attacks have become more sophisticated. One example of this is the distributed denial-of-service attack (DDoS). Early DoS attacks were typically launched from a single system. In a DDoS attack, multiple systems are used to flood the victim system with requests. Often the systems participating in the DDoS attack are not even aware that they are participants, as is the case of system infected with a virus that launches the attack.

In order to mitigate the damage caused by DoS and DDoS attacks, it is desirable to both detect such attacks early, and trace attacks back to their source. However, when the attacks come from multiple sources, it is difficult for current detection systems to trace the attack to the multiple sources.

In view of the above problems, there is a need in the art for the present invention.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description. Further, the same base reference number (e.g. 150) is used in the specification and figures when generically referring to the actions or characteristics of a group of identical components. A numeric index introduced by a decimal point (e.g. 150.1) is used when a specific component among the group of identical components performs an action or has a characteristic.

The detailed description is divided into multiple sections. In the first section, a system and software operating environment of different embodiments of the invention is described. In the second section, methods according to various embodiments of the invention are described. In the final section, a conclusion is provided.

System and Software Operating Environment

Figure 1:
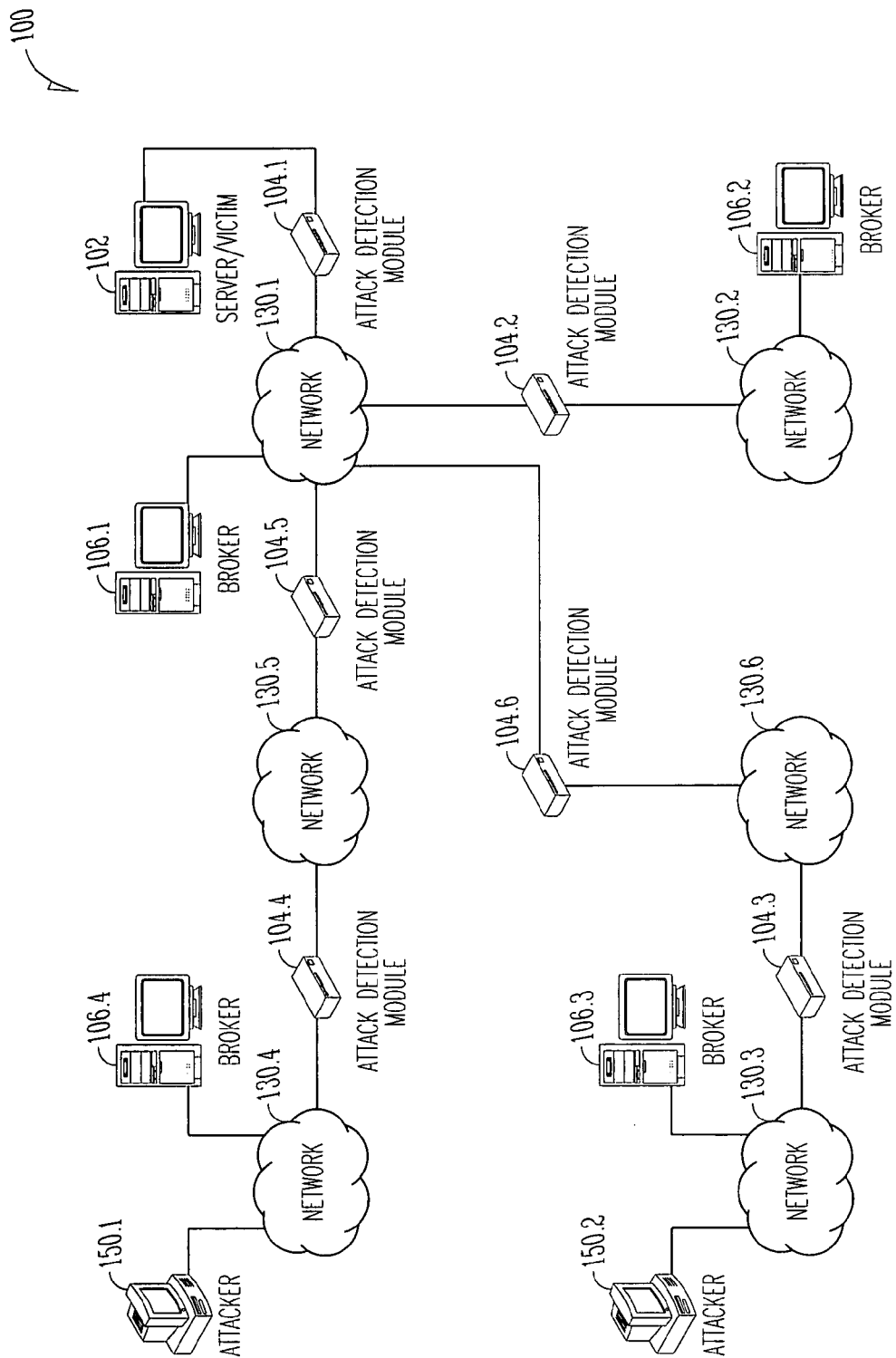
FIG. 1 is a block diagram illustrating a system level overview of an exemplary environment in which embodiment of the invention may be practiced.

FIG. 1 is a block diagram of a system and software environment 100 incorporating various embodiments of the invention. The systems and methods of the present invention may be provided on any hardware or software system that supports networking. Typically such hardware includes switches, routers, gateways, hubs, bridges, personal computers, server computers, mainframe computers, laptop computers, portable handheld computers, personal digital assistants (PDAs), network enabled cellular telephones and hybrids of the aforementioned devices. In some embodiments of the invention, operating environment 100 includes victim system 102, attack detection modules 104, broker modules 106 and attacker systems 150. The systems in the operating environment may be communicably coupled by one or more networks 130. The software components running in the operating environment are typically read from a machine-readable media and run under the control of an operating system, and are interfaced with the operating system. Examples of such machine-readable media include hard disks, floppy disks, CD-ROMs, DVD-ROMs. Further, machine-readable media includes wired and wireless signals transmitted over a network. Examples of operating systems include Windows® 95, Windows 98®, Windows Me®, Windows CE®, Windows® NT, Windows 2000® and Windows XP® by Microsoft Corporation. However, the present invention is not limited to any particular operating system, and in alternative embodiments the software components may operate within the Palm OS® from Palm Inc., variants of the UNIX and Linux operating systems and cellular telephone operating systems.

Attacker system 150 comprises computer systems capable of performing a denial-of-service attack. The denial-of-service attack may be a SYN flood, a ping flood, a "ping of death" flood, or a port scan, all of which are known in the art. The invention is not limited to handling any particular type of denial-of-service attack.

Victim system 102 comprises a system that is the target of one or more attacker systems 150. Victim system 102 may be any type of computer system, including a server, personal computer, mainframe computer, router, bridge, switch or other network attached system.

Victim system 102 and attacker system 150 may be communicably coupled by one or more networks 130. Network 130 may be any type of wired or wireless network, the invention is not limited to any particular type of network. In some embodiments of the invention, the network protocol is IP (Internet Protocol). In further embodiments of the invention, the network protocol is TCIP/IP (Transmission Control Protocol/Internet Protocol). In still further embodiments, the network protocol is UDP/IP (User Datagram Protocol/Internet Protocol). However, the invention is not limited to any particular type of network protocol. Further, in some embodiments of the invention, one or more of networks 130 comprise the Internet. In still further embodiments of the invention, one or more of networks 130 comprise a corporate intranet.

Attack detection module 104 comprises a device communicably coupled to a network 130 that may monitor and/or manipulate network traffic at ingress and egress points of network 130. Attack detection module 104 operates to cache information about network traffic passing through it, and is further operable to maintain statistics regarding network traffic. Attack detection module 104, in some embodiments, analyzes the cached information to look for signatures corresponding to various types of denial-of-service attacks. In some embodiments of the invention, attack detection module 104 is a SmartLink device available from Intel Corp. Attack detection module 104 may receive configuration data from a broker module 106. Such configuration data may be policy based as is known in the art.

Broker module 106 operates to receive denial-of-service attack indications from one or more attack detection modules 104. Upon receiving such an indication, broker module 106 may operate to receive attack instance data from the attack detection modules, and may communicate the attack instance data to peer broker modules 106.

The operation of the system described above will now be described with reference to an example of a TCP/IP SYN attack. However, the system operation described below applies as well to other types of denial of service attacks. Further details on the operation of various embodiments of the invention are provided in the methods section below.

Figure 2:
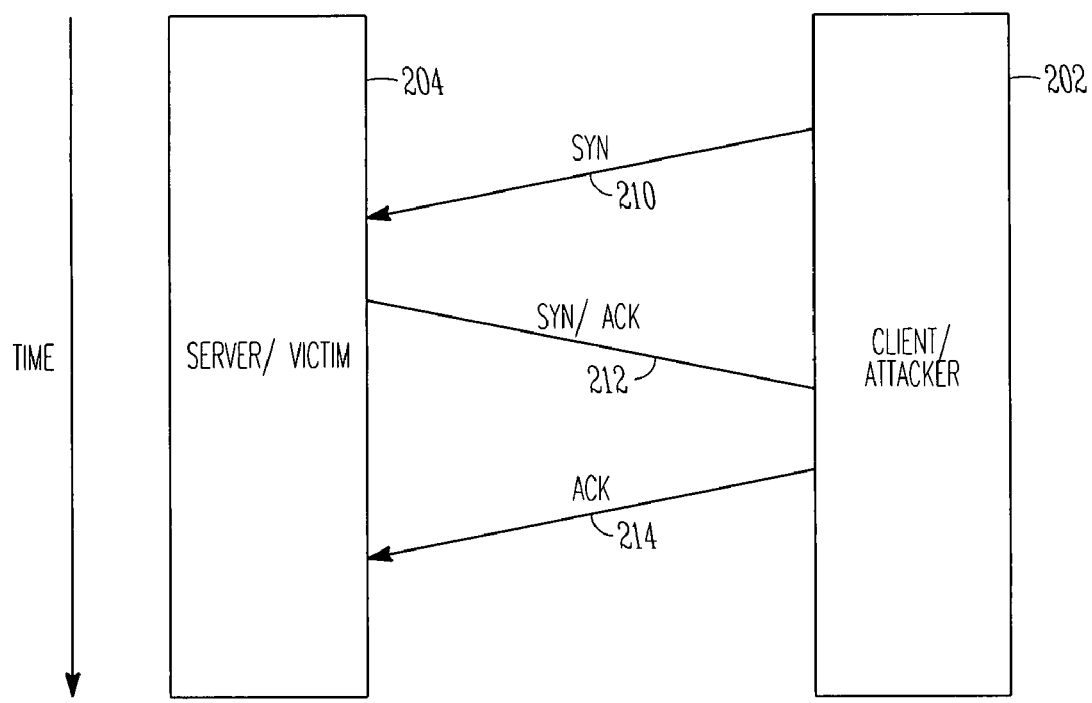
FIG. 2 is a diagram illustrating a network session initialization.

FIG. 2 is a diagram illustrating network connection initialization traffic in a TCP/IP environment. The connection process in the TCP/IP environment is generally referred to as a three-way handshake. A connection is initiated when a system that desires to connect to another system, typically a client system 202, issues a SYN packet 210 to a second system, typically a server system 204. Server system 204 then responds with a SYN/ACK packet 212. Finally, client system 202 responds with an ACK packet 214. Those of skill in the art will appreciate that the above-described connection process operates equivalently in peer to peer systems and in multi-tier systems.

In a typical SYN flood denial-of-service attack, an attacking system 202 issues a SYN packet 210, but does not follow up with an ACK packet 214. This leaves the server system 202 in a "half-open" state, waiting for the ACK packet 214. While in this half-open state, server system 204 must reserve processor and/or memory resources that would otherwise be available for legitimate connections. If enough half-open connections are created, server 204 may run out of resources and not be able to process further connection attempts, thereby causing legitimate clients to be denied service.

Returning to FIG. 1, assume attacker systems 150.1 and 150.2 initiate a denial-of-service attack against victim system 102. In order to avoid obscuring the invention, only two sources for a DDoS are illustrated in FIG. 1. Those of skill in the art will appreciate that the actual number of attacker systems in a typically DDoS may vary and will likely be more than two.

The attacks from attacker system 150.1 will follow a path that includes networks 130.4, 130.5 and 130.1. The attacks from attacker system 150.2 will follow a path that includes networks 130.3, 130.6 and 130.1. Attack detection module 104.1 detects the abnormal traffic indicating a potential denial-of-service attack. Attack detection module 104.1 may send an alarm to broker module 106.1. Note that attack detection modules 104 may also send the cache information they have collected to peer broker modules 106. Based on the alarm raised by the attack detection module 104.1, broker module 106.1 may analyze the information in the cache for filtering possible sources of the attack. Each attack will typically have its own signature and broker module 106.1 may filter the relevant entries based on the attack signature.

For example, in the case of TCP SYN flood attack described above, broker module 106.1 will use the cache to determine cache data that represents TCP traffic and find a shortlist of the source addresses that have incomplete connection establishment, i.e. cache entries for which the protocol indicates TCP and that have the SYN bit set but not the ACK bit set. In some embodiments, the broker module additionally checks the cache for a corresponding reverse entry in the cache that has the SYN-ACK bit set. This indicates the connection attempts for which the server has responded with a SYN-ACK but the client has not completed the handshake.

In the case of port scanning attacks, broker module 106.1 will look for those cache entries that have the same source address and destination address but different port numbers and for which the number of packets or the packet sizes are relatively small.

Once broker module 106.1 has identified likely sources for the attack, it may create attack instance data that identifies the potential source and type of attack. Broker module 106.1 may then obtain cache information from its border attack detection modules 104.2, 104.5 and 104.6. Broker 106.1 may then analyze its cache data to determine if any of the likely attack source IP addresses were seen by either of border attack detection modules 104.2, 104.5 and 104.6. In this example, some of the source addresses seen by attack detection module 104.6 will match the short listed addresses. Broker module 106.1 may now communicate with broker module 106.3 (and any other peer brokers in domains contributing to traffic seen by attack detection module 104.6) and transmit the list of cache entries seen by attack detection modules 104.1 and 104.6. Similarly, attack instance data may be sent to broker 106.4 with a list of entries common to attack detection modules 104.1 and 104.5. Note that attack detection module 104.2 will most likely not contribute any information, because its network 130.2 is not in the path of either denial of service attack.

Brokers 106.3 and 106.5 can now do similar analysis within their domains to pinpoint the source of the attack. Once the source is determined, action can be taken by the brokers 106 within their domain to suppress the attack. These actions include and are not limited to turning off the offending machine, stopping traffic originating from the machine targeted towards the victim and analyzing the traffic pattern to and from the offending machines (attack sources) to investigate and identify a master controller.

In some embodiments of the invention, broker modules 106 persist the cache information received from their border attack detection modules 104. The data persisted can be dependent on the time that they were received or an upper limit on the amount of data to be persisted. The persisted data may be useful for forensic purposes for post attack analysis.

This section has described the various logical modules in a system that detects denial-of-service attacks and traces such attacks back to their source. As those of skill in the art will appreciate, the software to implement the modules can be written in any of a number of programming languages known in the art, including but not limited to C/C++, Java, Visual Basic, Smalltalk, Pascal, Ada and similar programming languages. The invention is not limited to any particular programming language for implementation.

Methods of an Exemplary Embodiment of the Invention

In the previous section, a system level overview of the operation of an exemplary hardware and software environment including various embodiments of the invention was described. In this section, the particular methods of the invention performed by an operating environment executing an exemplary embodiment are described by reference to a series of flowcharts shown in FIGS. 3A, 3B and 4. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from a computer-readable media). The methods illustrated in FIGS. 3A, 3B and 4 are inclusive of the acts performed by an operating environment executing an exemplary embodiment of the invention.

Figure 3A:
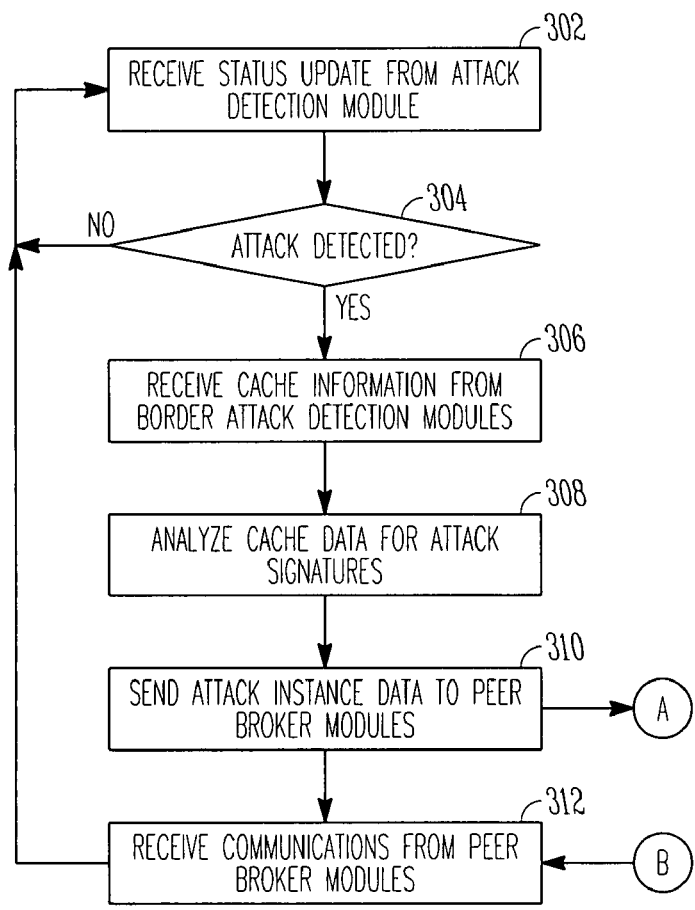
FIG. 3A is a flowchart illustrating a method according to an embodiment of the invention for detecting and tracing a denial-of-service attack.
Figure 3B:
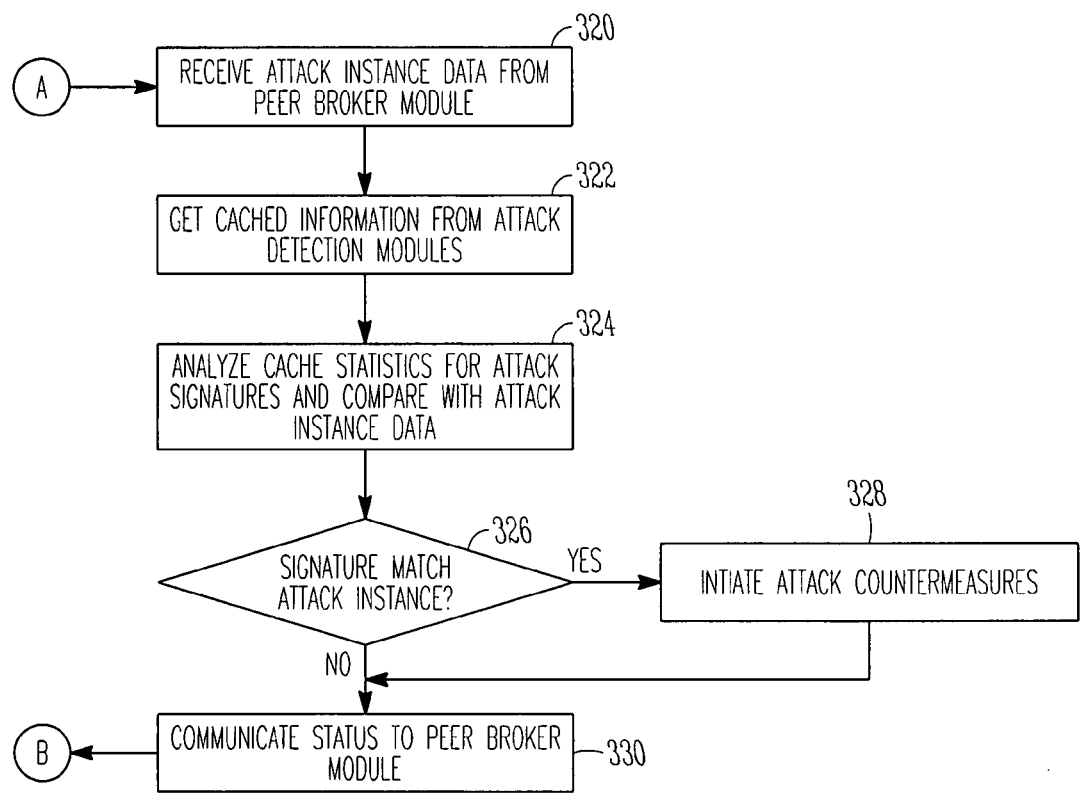
FIG. 3B is a flowchart providing further details for a method according to an embodiment of the invention for tracing a denial-of-service attack.
Figure 4:
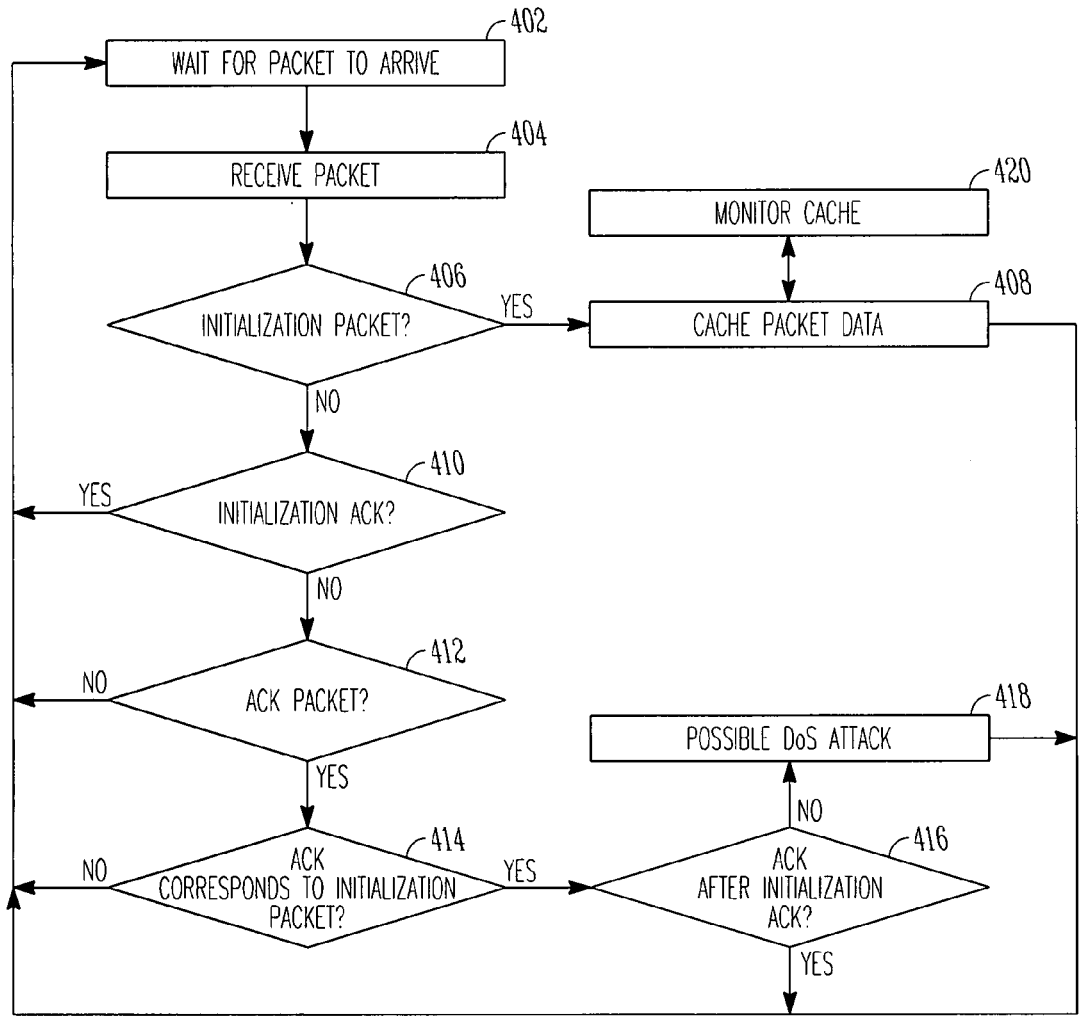
FIG. 4 is a flowchart illustrating a method according to an embodiment of the invention for detecting a denial of service attack.

FIG. 3A is a flowchart illustrating a method according to an embodiment of the invention for detecting and tracing a denial-of-service attack. The method begins when a system, such as a broker module 106, receives a status update from an attack detection module 104 (block 302). The status update may be initiated by a denial-of-service attack, or it may be a periodic update.

Next, the system determines if a potential attack is in progress (block 304). If no attack is detected, the method returns to block 302 to await the next status update. However, if a potential attack is indicated, the system then retrieves cache information from one or more communicably coupled attack detection modules 104 (block 306). In some embodiments where the network protocol is the TCIP/IP protocol, the cached information may include the source IP address, the destination IP address, source port, destination port and protocol for a connection flow. In alternative embodiments of the invention, the cached data further includes statistics about a connection flow such as the byte count, packet count, first packet time, and last packet time. In still further alternative embodiments, the cached data includes TCP flags indicating the connection status (established, closed, half-open etc).

The system then analyzes the cached data collected from one or more attack detection modules 104 and determines if any attack signatures are present (block 308). Various types of attack signatures are possible depending on the type of attack. For example, in a SYN flood attack, the signature may comprise numerous half-open connections in the cached data. In the case of a port scan, the attack signature may comprise numerous attempts to open ports in a serial fashion from the same source address.

After identifying an attack signature, attack instance data is created and sent to peer broker modules 106 (block 310). The attack instance data may be used to identify the type and the source or sources of a particular attack.

Next, in some embodiments, the system waits for communication from peer broker modules 106 (block 312). The communication may be a confirmation of the attack, or it may be information indicating a peer broker module 106 is not seeing the attack. This information can be used to narrow the potential sources of the attack.

FIG. 3B is a flowchart providing further details for a method according to an embodiment of the invention for tracing a denial-of-service attack. The actions detailed in FIG. 3B may be performed by a peer broker module 106 after it has been informed of a potential attack from another peer broker 106. The method begins when the broker module 106 receives attack instance data from a peer broker module 106 (block 320).

Next, the system retrieves cached data from border attack detection modules in the same network domain as the broker module 106 (block 322). The collected cache data may be analyzed to determine potential attack signatures as described above. The potential attack signatures may then be analyzed and compared to attack instance data (block 324).

If there is a match (block 326), then attack countermeasures may be initiated in some embodiments of the invention (block 328). These attack countermeasures may include filtering packets from the source identified in the attack instance data, turning off the suspected source of the attacks, or reporting the attack to a network console.

FIG. 4 is a flowchart illustrating a method according to an embodiment of the invention for detecting a denial of service attack. The method begins when a system desiring to detect denial-of-service attacks waits for network packets to arrive (block 402). After a packet is received (block 404), the packet type is checked. In some embodiments of the invention, a check is made to see if the packet is an initialization packet (block 406). In some embodiments, the initialization packet will be a SYN packet.

If the packet is an initialization packet, then data regarding the packet is cached (stored) in a memory (block 408). In some embodiments, this data includes a source address, a source port, a destination address, a destination port, a packet type, and a time stamp. Control returns to block 402 to await arrival of other packets.

Otherwise, a check is made to see if the packet is an initialization acknowledgement packet (block 410). In some embodiments, the initialization acknowledgement packet will be a SYN/ACK packet. If the packet is an initialization acknowledgement packet, some embodiments of the invention record a source address, a source port, a destination address, a destination port, a packet type, and a time stamp for the packet. Control then returns to block 402 to wait for the next packet to arrive.

Otherwise, if the packet is not an initialization acknowledgement packet, then some embodiments of the invention check the packet to determine if it is an acknowledgment packet (block 412). If the packet is not an acknowledgement packet, then control returns to block 402 to wait for the next packet.

In some embodiments, if the packet is an acknowledgement packet, then a check is made to determine if the acknowledgement packet arrived after a corresponding initialization packet (block 414). In some embodiments of the invention, the acknowledgement packet will be an ACK packet. If the acknowledgement packet does not correspond to a previously issued initialization packet, then control returns to block 402 to wait for the next packet.

However, in some embodiments of the invention, if the acknowledgement packet does correspond with a previously issued initialization packet, then a check is made to determine if the acknowledgement packet arrived after the corresponding initialization acknowledgement packet (block 416). If it did arrive after the corresponding initialization acknowledgement packet, then control returns to block 402 to await the next packet. In this case, a connection is fully open and is most likely a legitimate connection.

However, if the acknowledgement packet arrives before a corresponding initialization acknowledgement packet, the system indicates a potential denial of service attack (block 418). In the case of TCP, a possible SYN flood attack is indicated. This case represents a situation where an attacker is attempting to spoof systems that merely count the number of initialization requests and acknowledgement responses without attempting to determine the timing relationship of the packets.

In addition, at any point during the method, the system may examine the data collected at blocks 408 and 410 to determine a count of how many initialization packets have been created without a corresponding acknowledgement packet (block 420). If the count exceeds a configurable or predetermined threshold, an indication that the system is under a denial-of-service attack may be generated.

Conclusion

Systems and methods for detecting a denial-of-service attack and tracing such an attack back to a source are disclosed. The embodiments of the invention provide advantages over previous systems. For example, the systems and method disclosed provide for the early and accurate detection of denial-of-service attacks. Furthermore, the systems and methods support automatically tracing a denial-of-service attack back to the source, thereby reducing or eliminating human intervention. This can result in earlier identification of the source of an attack.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

We claim:

1. A method comprising:
   receiving an initialization packet from a network source on a network having a network protocol,
   sending an initialization acknowledgement packet in response to the initialization packet;
   caching information regarding the initialization acknowledgement packet, said information including an initialization acknowledgement packet time;
   receiving an acknowledgement packet from the network source, said packet having an acknowledgement arrival time;
   comparing the acknowledgement arrival time with the initialization acknowledgement packet time; and
   if the acknowledgement arrival time is after the initialization packet and before the initialization acknowledgement packet time then indicating a potential denial-of-service attack.

2. The method of claim 1, wherein the network protocol comprises an IP network protocol.

3. The method of claim 1, wherein the network protocol comprises a TCP/IP network protocol and wherein the initialization packet comprises a SYN packet, the initialization acknowledgement packet comprises a SYN/ACK packet, and the acknowledgement packet comprises an ACK packet.

4. A machine-readable storage medium having machine executable instructions to perform a method for detecting a denial-of-service attack, the method comprising:
   receiving an initialization packet from a network source on a network having a network protocol;
   sending an initialization acknowledgement packet in response to the initialization packet;
   caching information regarding the initialization acknowledgement packet, said information including an initialization acknowledgement packet time;
   receiving an acknowledgement packet from the network source, said packet having an acknowledgement arrival time;
   comparing the acknowledgement arrival time with the initialization acknowledgement packet time; and
   if the acknowledgement arrival time is after the initialization packet and before the initialization acknowledgement packet time the indicating a potential denial-of-service attack.

5. The machine-readable storage medium of claim 4, wherein the network protocol comprises an IP network protocol.

6. The machine-readable storage medium of claim 4, wherein the network protocol comprises a TCP/IP network protocol and wherein the initialization packet comprise a SYN packet, the initialization acknowledgement packet comprises a SYN/ACK packet, and the acknowledgement packet comprises an ACK packet.

* * * * *

UNITED STATES PATENT AND TRADEMARK OFFICE
CERTIFICATE OF CORRECTION

PATENT NO. : 7,269,850 B2  Page 1 of 1
APPLICATION NO. : 10/335197
DATED : September 11, 2007
INVENTOR(S) : Govindarajan et al.

It is certified that error appears in the above-identified patent and that said Letters Patent is hereby corrected as shown below:

In column 8, line 53, in Claim 4, delete "the" and insert -- then --, therefor.

In column 8, line 60, in Claim 6, delete "comprise" and insert -- comprises --, therefor.

Signed and Sealed this

Fifteenth Day of July, 2008

JON W. DUDAS
*Director of the United States Patent and Trademark Office*